(12) United States Patent
Okochi

(10) Patent No.: US 7,007,668 B2
(45) Date of Patent: Mar. 7, 2006

(54) IGNITION CONTROL SYSTEM FOR INTERNAL COMBUSTION ENGINE

(75) Inventor: Yasuhiro Okochi, Nagoya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/171,214

(22) Filed: Jul. 1, 2005

(65) Prior Publication Data

US 2006/0016428 A1     Jan. 26, 2006

(30) Foreign Application Priority Data

Jul. 26, 2004   (JP)   ............................ 2004-217023
Apr. 18, 2005   (JP)   ............................ 2005-119811

(51) Int. Cl.
    *F02P 5/02*          (2006.01)

(52) U.S. Cl. .................................. 123/406.52; 123/399

(58) Field of Classification Search ................ 123/399, 123/406.18, 406.24, 406.36, 406.5, 406.52
See application file for complete search history.

(56) References Cited

U.S. PATENT DOCUMENTS

| | | | |
|---|---|---|---|
| 5,222,470 A * | 6/1993 | Oonuma et al. ....... | 123/339.11 |
| 6,116,213 A * | 9/2000 | Yasui et al. ............ | 123/339.11 |
| 6,212,879 B1 * | 4/2001 | Nishimura et al. ........... | 60/274 |
| 6,220,904 B1 * | 4/2001 | Hoshiba et al. ................ | 440/1 |
| 6,234,147 B1 | 5/2001 | Hirakata et al. ....... | 123/406.51 |
| 6,237,327 B1 * | 5/2001 | Nishimura et al. ........... | 60/276 |
| 6,276,131 B1 * | 8/2001 | Ueno et al. ................... | 60/285 |
| 6,845,749 B1 * | 1/2005 | Kubo .................... | 123/339.11 |

* cited by examiner

*Primary Examiner*—Hai Huynh
(74) *Attorney, Agent, or Firm*—Nixon & Vanderhye P.C.

(57) ABSTRACT

An ignition control system for an internal combustion engine includes a throttle opening detector, a crank angle detector, a stroke determiner, and an ignition timing corrector. The throttle opening detector detects a throttle opening of a throttle valve disposed in an intake passage of the internal combustion engine. The crank angle detector detects a crank angle signal associated with the rotation of a crankshaft of the internal combustion engine. The stroke determiner determines a stroke based on the crank angle signal. The ignition timing corrector corrects ignition timing in a retardation direction by a predetermined retardation angle when the throttle valve is rapidly opened to a predetermined throttle opening and then rapidly closed within a predetermined time period including one combustion cycle of the internal combustion engine. The stroke determiner defines the combustion cycle. The predetermined retardation angle is based on at least the throttle opening.

14 Claims, 5 Drawing Sheets

| ΔTA [°] | 0.0 | 7.8 | 15.6 | ... | ... |
|---|---|---|---|---|---|
| K$_{ASNP}$ [°CA] | 0.00 | 2.46 | 2.46 | ... | ... |

IGNITION CONTROL SYSTEM FOR INTERNAL COMBUSTION ENGINE

CROSS REFERENCE TO RELATED APPLICATIONS

This application is based upon and claims the benefit of priority of Japanese Patent Application No. 2004-217023, filed on Jul. 26, 2004 and Japanese Patent Application No. 2005-119811, filed on Apr. 18, 2005, the contents of which are incorporated herein by reference.

FIELD OF THE INVENTION

The embodiments of the present invention relate to an ignition control system for an internal combustion engine and, more particularly, an ignition control system in which ignition control is implemented through evaluating ignition timing based on the rotation of a crankshaft of the internal combustion engine.

BACKGROUND OF THE INVENTION

An example of a publication of the conventional technology of an ignition control system for an internal combustion engine includes Japanese Patent Laid-Open Publication No. 2000-9007. In this publication, a technology for preventing knocking and acceleration shock and the like in an internal combustion engine through controlling ignition timing at the time of rapid acceleration of the internal combustion engine is disclosed. At the time of rapid acceleration (when a throttle opening of a throttle valve is rapidly shifted to the opening direction from a state in which the throttle opening is kept constant), the ignition timing is retarded to prevent the shock caused by the rapid acceleration.

Generally, in an independent intake type internal combustion engine, base ignition timing is determined based on a throttle opening and an engine rotation speed, and the base ignition timing is corrected based on various parameters such as a cooling water temperature, atmospheric pressure, and a gear position of a transmission to evaluate the final ignition timing.

However, in the internal combustion engine described above, when a sequence of operations in which a throttle valve is rapidly opened from a predetermined throttle opening and then rapidly closed is started and finished within a very short period of time (a period of time shorter than the period of one cycle of the internal combustion engine), the internal combustion engine continues operation as if the variation of the throttle opening was not caused by the rapid opening of the throttle valve. Therefore, the actual ignition timing is largely different from the optimal ignition timing, which is required by the internal combustion engine, thereby disadvantageously causing knocking or the like.

SUMMARY OF THE INVENTION

The embodiments of the present invention have been made to solve the above-described and other problems to provide an ignition control system for an internal combustion engine, which can prevent the occurrence of knocking or the like through providing optimal ignition timing even when a sequence of operations in which a throttle valve is rapidly opened from a predetermined throttle opening and then rapidly closed is started and finished within a very short period of time in one combustion cycle of the internal combustion engine.

According to one aspect of the present invention, there is provided an ignition control system for an internal combustion engine. In this system, ignition timing correction means corrects the ignition timing evaluated based on various parameters including a throttle opening by a predetermined retardation angle to the retardation direction when a sequence of operations is started and finished within a short period of time (a predetermined time period) in one combustion cycle. In the sequence of operations, a throttle valve is rapidly opened from a predetermined throttle opening and then rapidly closed, which is detected by throttle valve opening detection means. The one combustion cycle is carried out after completion of stroke determination which is carried out by stroke determination means by use of a crank angle signal detected by crank angle detection means, associated with the rotation of a crankshaft of the internal combustion engine. Therefore, the occurrence of knocking or the like may be appropriately prevented when the sequence of the operations (in which the throttle valve is rapidly opened from the predetermined throttle opening and then rapidly closed) is started and finished within a very short period of time in one combustion cycle of the internal combustion engine.

According to another aspect of the present invention, there is provided an ignition control system for an internal combustion engine in which the ignition timing correction means determines the predetermined retardation angle when the sequence of the operations of the throttle valve is started and finished within a vary short period of time (100 ms). In this manner, the occurrence of knocking or the like may be appropriately prevented.

According to yet another aspect of the present invention, there is provided an ignition control system for an internal combustion engine in which the ignition timing correction means determines the predetermined retardation angle when the sequence of the operations of the throttle valve is performed at an engine rotational speed, which is evaluated based on the crank angle signal, of about an idling rotational speed. In this manner, the occurrence of knocking or the like may be appropriately prevented at around the idling rotational speed.

According to yet another aspect of the present invention, there is provided an ignition control system for an internal combustion engine in which the ignition timing correction means determines the predetermined retardation angle when at least a part of the latter period of the sequence of the operations of the throttle valve (the period after the throttle valve starts closing) overlaps with the intake stroke of one combustion cycle of the internal combustion engine. In this case, the sequence of the operations of the throttle valve leads to a substantial change in the air intake of the internal combustion engine, and thus the occurrence of knocking or the like caused by the substantial change in the air intake of the internal combustion engine may be appropriately prevented.

According to still another aspect of the present invention, there is provided an ignition control system for an internal combustion engine in which the predetermined retardation angle is determined in accordance with a throttle opening change during the latter period of the sequence of the operations of the throttle valve (the period after the throttle valve starts closing). In this manner, the predetermined retardation angle is set as the optimal value which addresses a substantial change in the air intake of the internal combustion engine, and thus the occurrence of knocking or the like may appropriately be prevented.

According to still another aspect of the present invention, there is provided an ignition control system for an internal combustion engine in which the ignition timing correction means is prohibited from determining the predetermined retardation angle when a throttle opening change during the latter period of the sequence of the operations of the throttle valve (the period after the throttle valve starts closing) is equal to or less than a predetermined value. That is, if the throttle opening change is equal to or less than the predetermined value, an air intake to the internal combustion engine is substantially unchanged. Therefore, the predetermined retardation angle for correcting the ignition timing to the retardation direction is set to 0° CA (Crank Angle) without performing the computation processing. In this manner, the computational processing speed may be improved when the throttle opening change falls within the predetermined range, and the occurrence of knocking or the like may appropriately be prevented.

According to a still yet another aspect of the present invention, there is provided an ignition control system for an internal combustion engine in which the internal combustion engine is a four-cycle single-cylinder engine or an independent intake type, four-cycle multi-cylinder engine. In the four-cycle single-cylinder engine or the independent intake type four-cycle multi-cylinder, the ignition timing for each cylinder is corrected by the predetermined retardation angle to the retardation direction when the sequence of the operations of the throttle valve is performed in one combustion cycle. Therefore, the occurrence of knocking or the like may be appropriately prevented.

Other features and advantages of the present invention will be appreciated, as well as methods of operation and the function of the related parts from a study of the following detailed description, appended claims, and drawings, all of which form a part of this application. In the drawings:

DETAILED DESCRIPTION OF THE PREFERRED EMBODIMENTS

Embodiments of the present invention will next be described by way of examples.

Figure 1:
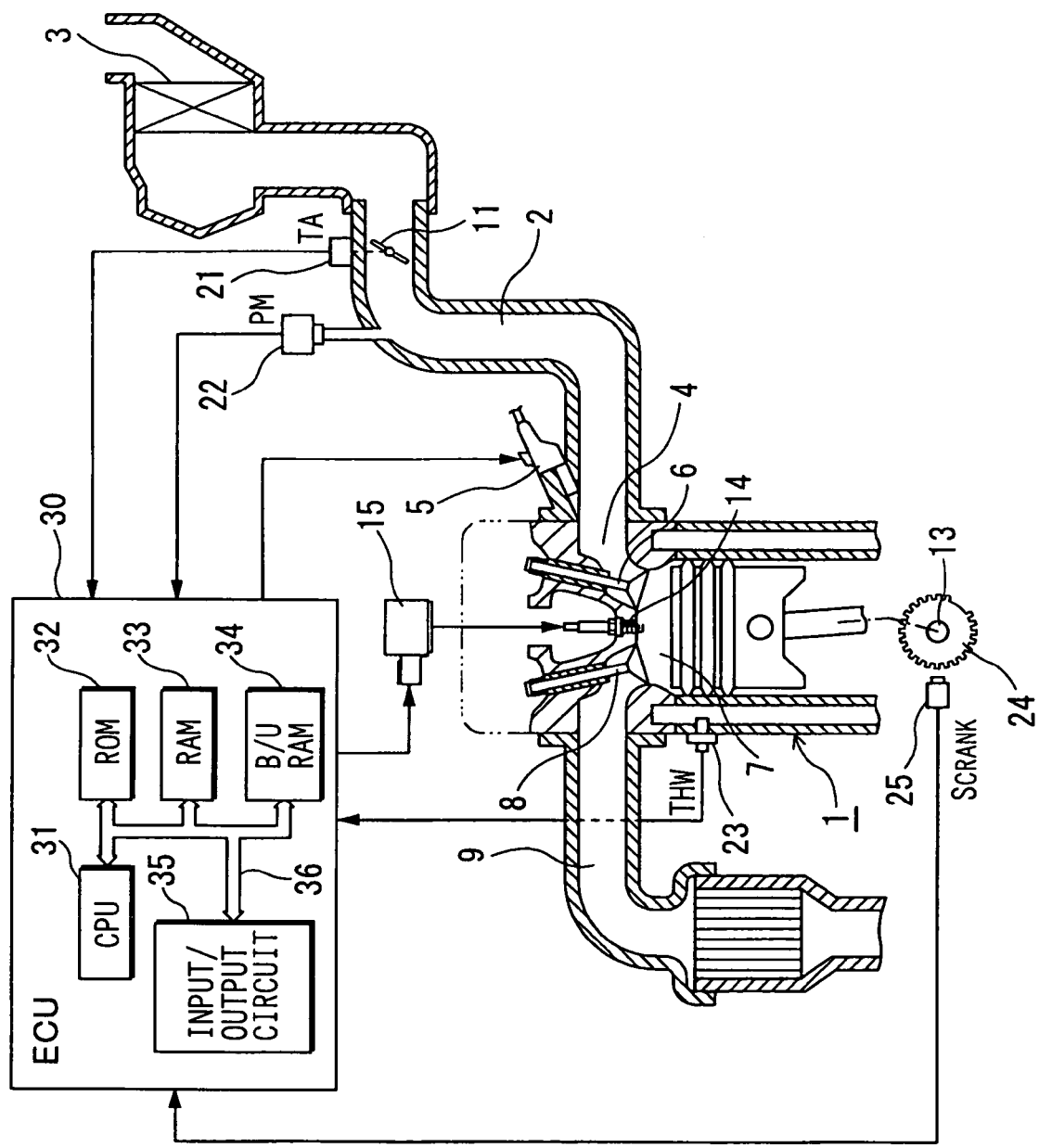
FIG. 1 is a schematic diagram of an ignition control device according to an embodiment of the present invention adapted to an internal combustion engine.

FIG. 1 is a schematic diagram illustrating the configuration of an internal combustion engine to which the ignition control device according to one embodiment of the present invention is adapted.

A reference numeral 1 in FIG. 1 denotes an internal combustion engine having a four-cycle single cylinder, and air is introduced to an intake passage 2 of the internal combustion engine 1 through an air cleaner 3. A throttle valve 11 is disposed in the intake passage 2 and is opened and closed in accordance with the extent of accelerator operation or the like by an operator (a driver). The amount of the intake air to the intake passage 2 is regulated through the opening and closing of the throttle valve 11. Fuel is pressure-pumped by a fuel pump from a fuel tank (not shown) in accordance with the amount of the intake air, and the pressure of the fuel is regulated by a pressure regulator. The fuel is injected from an injector (a fuel injection valve) 5 disposed in the intake passage 2 near an intake port 4 of the internal combustion engine 1. A fuel-air mixture comprising a predetermined amount of fuel and a predetermined amount of intake air is injected into a combustion chamber 7 through an intake valve 6.

A throttle opening sensor 21 is placed in the throttle valve 11 disposed in the intake passage 2 to detect a throttle opening TA based on the extent of the accelerator operation and the like. An intake pressure sensor 22 is disposed downstream of the throttle valve 11 to detect an intake pressure PM in the intake passage 2. A water temperature sensor 23 is disposed in the internal combustion engine 1 to detect a cooling water temperature THW. In addition, a crank rotor 24 is fixedly attached to a crankshaft 13 of the internal combustion engine 1, and a crank angle sensor 25 is provided to detect a crank angle signal SCRANK which is generated associated with the rotation of the crank rotor 24.

The crank rotor 24 has a plurality of equiangularly spaced gear teeth (24 gear teeth). Two teeth which are adjacent to each other have been removed to form a teeth removed part, and thus the number of teeth is given by 24-2. The position of the teeth removed part can be known from the crank angle signal SCRANK output from the crank angel sensor 25 in accordance with the rotation of the crank rotor 24 fixedly attached to the crankshaft 13 since the pulse generation interval of the crank angle signal SCRANK for the teeth removed part is different from the other part. In addition, an engine rotational speed NE of the internal combustion engine 1 is evaluated based on the pulse generation interval of the crank angle signal SCRANK detected by the crank angle sensor 25.

A spark plug 14 is disposed inside the combustion chamber 7 of the internal combustion engine 1. A high voltage is applied to the spark plug 14 from an ignition coil 15 based on an ignition instruction signal output from an ECU (Electronic Control Unit, to be described later) 30 synchronized with the crank angle signal SCRANK detected by the crank angle sensor 25, and the fuel-air mixture in the combustion chamber 7 is ignited for combustion. Therefore, a driving force is produced through the combustion (expansion) of the fuel-air mixture in the combustion chamber 7, and the exhaust gas after the combustion is introduced to an exhaust passage 9 from an exhaust manifold through an exhaust valve 8 and is discharged to the outside.

The ECU 30 is a logical operation circuit which includes a CPU 31 serving as a well-known central processing unit for performing various computational processes, a ROM 32 for storing a control program, a control map, and the like, a RAM 33 for storing various data and the like, a B/U (backup) RAM 34, an input-output circuit 35, and a bus line 36 for connecting the above devices. The throttle opening TA from the throttle opening sensor 21, the intake pressure PM from the intake pressure sensor 22, the cooling temperature THW from the cooling temperature sensor 23, the crank angle signal SCRANK from the crank angle sensor 25, and the like are input to the ECU 30. Based on an output signal generated by the ECU 30 in accordance with the information of the various sensors, the injector 5 is controlled for the fuel injection timing and the fuel injection amount, and the ignition plug 14 and the ignition coil 15 are controlled for the ignition timing, in accordance with need.

Next, with reference to a time chart shown in FIG. 2, the relationship of the change of the throttle opening TA during a sequence of operations (in which the throttle valve 11 is rapidly opened to a predetermined throttle opening and then rapidly closed) with respect to the position of a crank angle signal counter NNUM (a stroke position) upon completion of stroke determination by use of the crank angle signal SCRANK will be described.

Figure 2:
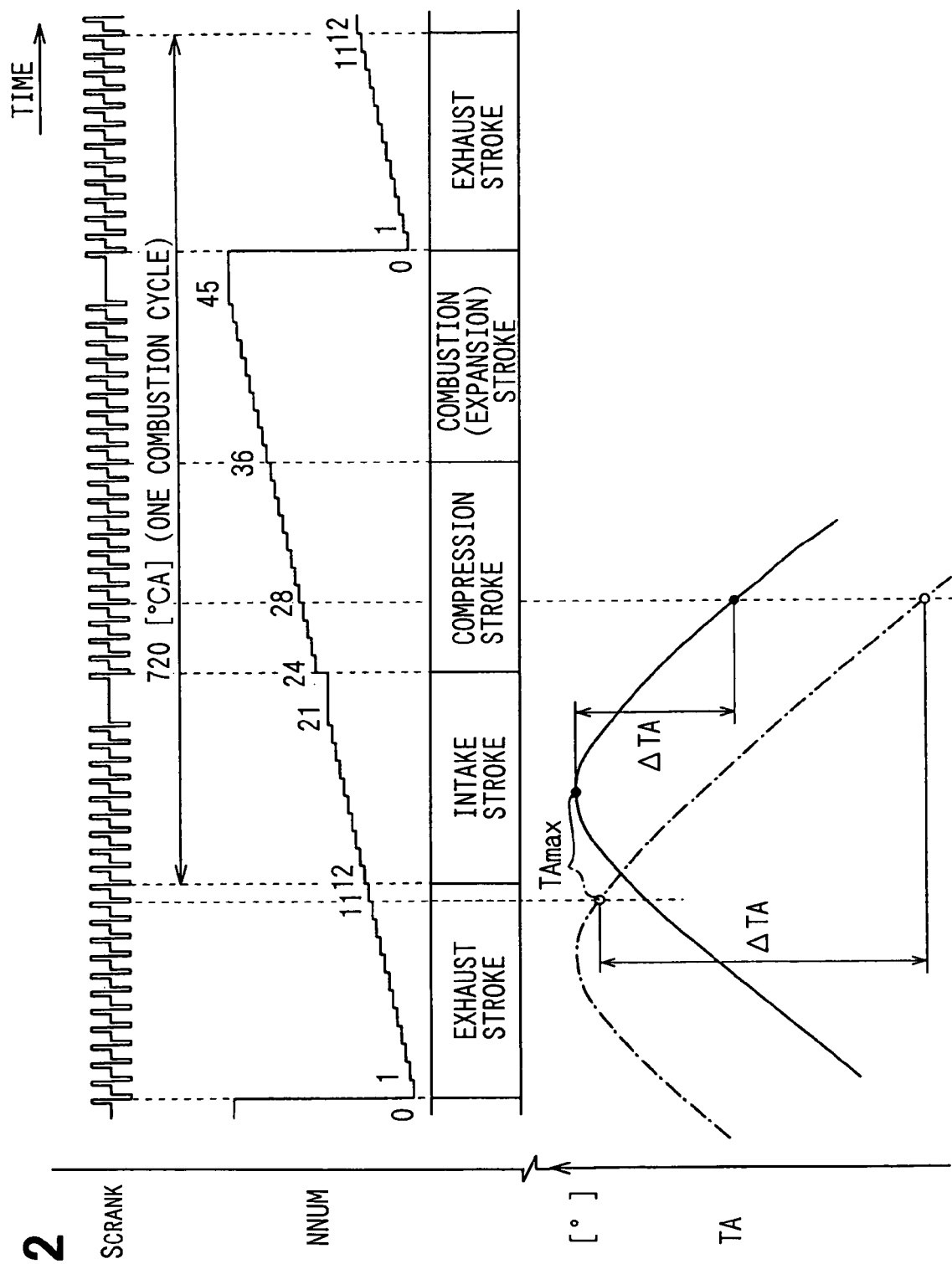
FIG. 2 is a time chart and related graph showing a relationship of a change of a throttle opening during operation relative to a stroke position according to an embodiment of the present invention.

In FIG. 2, one combustion cycle consists of four cycles (an intake stroke, a compression stroke, a combustion (expansion) stroke, and an exhaust stroke) and corresponds to 720° CA. If the intake pressure PM detected by the intake pressure sensor 22 is about atmospheric pressure, and when the first crank angle signal SCRANK is generated after the teeth removed part, the crank angle position at this timing is employed as a reference crank angle position in the rotational direction of the crankshaft 13. Also at this timing, the crank angle signal counter NNUM is set to zero, which represents the start timing of the exhaust stroke, and the stroke determination is completed.

After the timing described above, the crank angle signal counter NNUM is incremented by 1 for each crank angle signal SCRANK, which is generated for each 15° CA. Note that, the pulse generation interval of the crank angle signal SCRANK is 45° CA for the teeth removed part. The crank angle signal counter NNUM is reset to zero for each combustion cycle corresponding to 720° CA at the generation timing of the first crank angle signal SCRANK in the exhaust stroke.

Upon completion of the stroke determination, the crank angle signal counter NNUM is incremented along with the rotation of the crankshaft 13, and, for controlling each stroke, the crank angle signal counter NNUMs 0 to 11 are assigned to the exhaust stroke, 12 to 21 are assigned to the intake stroke, 24 to 35 are assigned to the compression stroke, and 36 to 45 are assigned to the combustion (expansion) stroke. Since two teeth which are adjacent to each other have been removed from the crank rotor 24 and the number of teeth is given by 24-2, the crank angle signal counter NNUMs 22, 23, 46, and 47 are not assigned.

Two examples of the change of the throttle opening TA during a sequence of operations in which the throttle valve 11 is rapidly opened to a predetermined throttle opening and then rapidly closed are shown in the graph of FIG. 2 by a solid line and an alternate long and short dash line with respect to the position of the crank angle signal counter NNUM (the stroke position) after stroke determination. The difference between the maximum throttle opening TAmax in the range of a crank angle signal counter NNUM of 11 to 28 and the throttle opening TA at a crank angle signal counter NNUM of 28 is defined as the amount of the throttle opening change ΔTA [°], which will be described hereinafter.

A process for evaluating an ignition timing correction coefficient in ignition control performed by the CPU 31 of the ECU 30 employed in the ignition control system for the internal combustion engine according to one embodiment of the present invention is shown in a flowchart illustrated in FIG. 3, and will be described with reference to FIGS. 2 and 4. FIG. 4 is a table employed in FIG. 3 for determining a predetermined retardation angle KASNP [° CA] (the ignition timing correction coefficient in the retardation direction) based on the amount of the throttle opening change ΔTA [°] as a parameter. The routine for evaluating the ignition timing correction coefficient is repeatedly performed by the CPU 31 each 5 ms.

Figure 3:
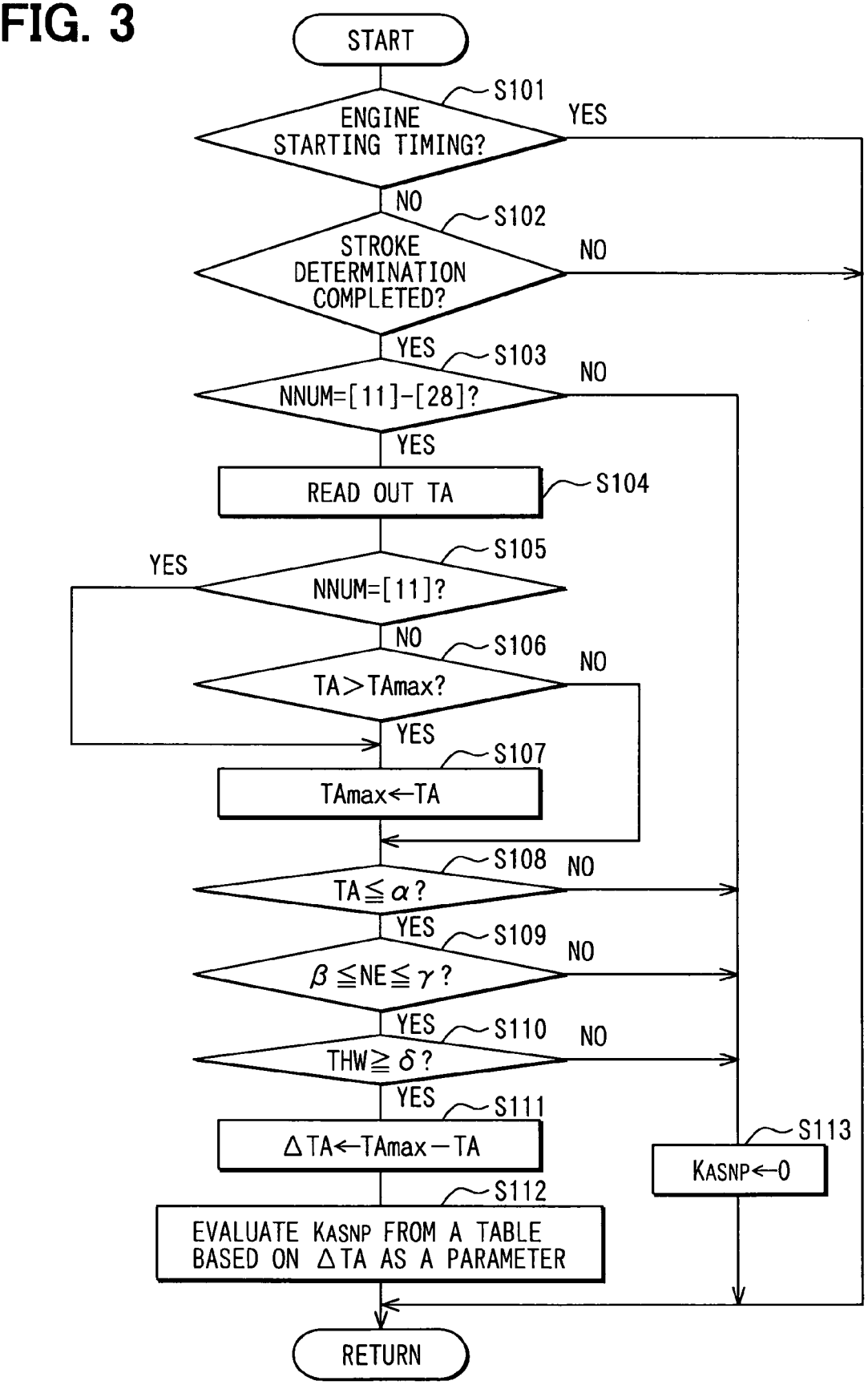
FIG. 3 is a flowchart of a process for evaluating an ignition timing correction coefficient according to an embodiment of the present invention.
Figures 4, 6:
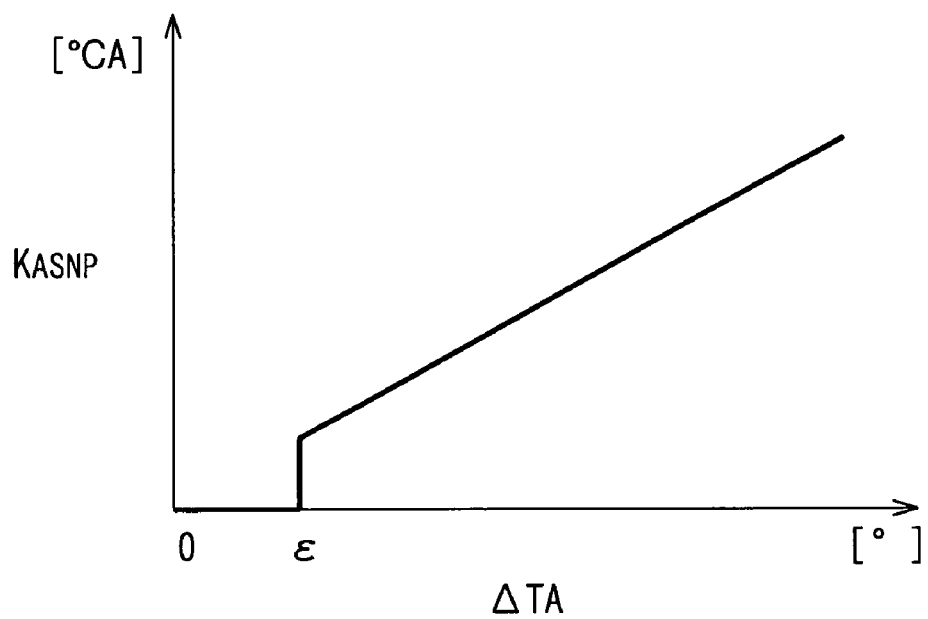
FIG. 4 is a table employed in the process of FIG. 3 for determining a predetermined retardation angle.
FIG. 6 is a graph employed in the process of FIG. 5 for determining a predetermined retardation angle.

In FIG. 3, step S101 determines whether or not the current timing is engine start-up timing. If the result of step S101 is yes meaning the current timing is the engine start-up timing of the internal combustion engine 1 by cranking, the routine is terminated without performing any processing. On the other hand, if the result of step S101 is no meaning the internal combustion engine 1 has already been started, the routine proceeds to step S102 to determine whether or not the stroke determination has been completed. If the result of step S102 is no meaning the stroke determination in a combustion cycle of the internal combustion engine 1 has not been completed, the routine is terminated without performing any processing.

On the other hand, if the result of step S102 is yes meaning the stroke determination in one combustion cycle of the internal combustion engine 1 has been completed, as described above, the routine proceeds to step S103 to determine whether or not the crank angle signal counter NNUM falls within the range of 11 to 28. If the result of S103 is yes meaning the crank angle signal counter NNUM falls within the range of 11 to 28, the routine proceeds to step S104 to read out the current throttle opening TA. Subsequently, the routine proceeds to step S105 to determine whether or not the crank angle signal counter NNUM is 11. If the result of step S105 is yes meaning the crank angle signal counter NNUM is 11, the routine proceeds to step S107.

On the other hand, if the result of step S105 is no meaning the crank angle signal counter NNUM is not 11, the routine proceeds to step S106 to determine whether or not the current throttle opening TA [°] exceeds the previous maximum throttle opening TAmax [°]. If the result of step S106 is yes meaning the current throttle opening TA exceeds the previous maximum throttle opening TAmax, the routine proceeds to step S107. In step S107, the previous maximum throttle opening Tamax, which has been stored in the RAM 33 is replaced by the throttle opening TA read out in step S104. On the other hand, if the result of step S106 is no meaning the current throttle opening TA does not exceed the previous maximum throttle opening TAmax, step S107 is skipped.

The routine then proceeds to step S108 to determine whether or not the throttle opening TA detected by the throttle opening sensor 21 is equal to or less than a predetermined throttle opening α [°]. The predetermined throttle opening α may be set to any value over almost the entire range of the throttle opening TA, and the throttle opening α is set to the optimal value through an adaptation procedure based on the specifications of the internal combustion engine 1. As a prerequisite, of course, the throttle opening sensor 21 must be operating correctly. If the result of step S108 is yes meaning the throttle opening TA is equal to or less than the predetermined throttle opening α, the routine proceeds to step S109. Step S109 determines whether or not the engine rotational speed NE [rpm] detected by the crank angle sensor 25 is equal to or larger than a predetermined rotational speed β [rpm] and is equal to or less than a predetermined rotational speed γ [rpm].

If the result of step S109 is yes meaning the current engine rotational speed NE falls within the range of the predetermined rotational speed β to the predetermined rotational speed γ (around an idling rotational speed), the routine proceeds to step S110. The above range around the idling rotational speed may differ among the types of the internal combustion engine 1, and is set to, for example, 600 to 2,000 [rpm]. Step S110 determines whether or not the cooling water temperature THW [° C.] detected by the water temperature sensor 23 is equal to or higher than a predetermined water temperature δ [° C.]. If the result of step S110 is yes meaning the cooling water temperature THW is equal to or higher than the predetermined water temperature 6 and the internal combustion engine 1 has finished warming up, the routine proceeds to step S111. The predetermined water temperature 6, which determines whether the internal combustion engine 1 has finished warming up, is set to, for example, 75° C.

In step S111, the throttle opening change ΔTA in the range of a crank angle signal counter NNUM of 11 to 28 is evaluated through subtracting the throttle opening TA at a crank angle signal counter NNUM of 28 from the maximum throttle opening TAmax determined in the range of a crank angle signal counter NNUM of 11 to 28 (see FIG. 2). Subsequently, the routine proceeds to step S112 to evaluate the predetermined retardation angle KASNP [° CA] through an interpolation computation based on the table shown in FIG. 4 and the throttle opening change ΔTA evaluated in step S111 as a parameter, and the routine is completed.

On the other hand, if the result of step S103 is no meaning the crank angle signal counter NNUM does not fall within the range of 11 to 28, or if the result of step S108 is no meaning the throttle opening TA at this timing is larger than the predetermined throttle opening α, or if the result of step S109 is no meaning the engine rotational speed NE does not fall within the range of the predetermined rotational speed β [rpm] to the predetermined rotational speed γ (around the idling rotational speed), or if the result of step S110 is no meaning the cooling water temperature THW is lower than the predetermined water temperature δ and the internal combustion engine 1 has not finished warming up, the routine proceeds to step S113. In step S113, the predetermined retardation angle KASNP is set to 0° CA, and the routine is completed.

As described above, the ignition control system for the internal combustion engine according to the present embodiment includes the throttle opening sensor 21; the crank angle sensor 25; stroke determination means; and ignition timing correction means. The throttle opening sensor 21 serves as throttle opening detection means and detects the throttle opening TA of the throttle valve 11 disposed in the intake passage 2 of the internal combustion engine 1. The crank angle sensor 25 serves as crank angle detection means and detects the crank angle signal SCRANK associated with the rotation of the crankshaft 13 of the internal combustion engine 1. The stroke determination means is realized by the ECU 30 to determine the stroke based on the crank angle signal SCRANK detected by the crank angle sensor 25. The ignition timing correction means is also realized by the ECU 30 to correct the ignition timing by the predetermined retardation angle KASNP to the retardation direction based on the throttle opening TA and other parameters such as the engine rotational speed NE. This occurs when the sequence of the operations, in which the throttle valve 11 is rapidly opened from a predetermined throttle opening and then rapidly closed, is started and finished within a predetermined time period in one combustion cycle, which is defined through the stroke determination means, of the internal combustion engine 1. The ignition timing correction means realized by the ECU 30 of the ignition control system according to the present embodiment determines the predetermined retardation angle KASNP when the sequence of the operations of the throttle valve 11 is started and finished within 100 ms. In addition, the internal combustion engine 1 is a four-cycle single-cylinder engine.

That is, when the sequence of the operations in which the throttle valve 11 is rapidly opened to a predetermined throttle opening and then rapidly closed is started and finished within a short period of time (100 ms as a predetermined period of time) in one combustion cycle after the stroke determination of the internal combustion engine 1, the ignition timing evaluated based on various parameters including the throttle opening TA is corrected by the predetermined retardation angle KASNP in the retardation direction. Therefore, the occurrence of knocking or the like may be prevented when the sequence of the operations in which the throttle valve 11 is rapidly opened to a predetermined throttle opening and then rapidly closed is started and finished within a very short period of time (100 ms) in one combustion cycle of the internal combustion engine 1.

The ignition timing correction means realized by the ECU 30 of the ignition control system of the internal combustion engine of the present embodiment determines the predetermined retardation angle KASNP when the sequence of the operations of the throttle valve 11 is performed at an engine rotational speed NE, which is evaluated based on the crank angle signal SCRANK, of about the idling rotational speed. Since knocking or the like tends to occur when the sequence of the operations of the throttle valve 11 is performed at an engine rotational speed NE approximately equal to the idling rotational speed of the internal combustion engine 1, the predetermined retardation angle KASNP is determined to appropriately prevent the knocking or the like at this speed.

The ignition timing correction means realized by the ECU 30 of the ignition control system of the internal combustion engine of the present embodiment determines the predetermined retardation angle KASNP when at least a part of the latter period of the sequence of the operations of the throttle valve 11 (the period after the throttle valve 11 starts closing) overlaps with the intake stroke of one combustion cycle of the internal combustion engine 1. That is, when at least a part of the latter period of the sequence of the operations of the throttle valve 11 (the period after the throttle valve 11 starts closing) overlaps with the intake stroke, the sequence of the operations of the throttle valve 11 leads to a substantial change in an air intake of the internal combustion engine 1, and thus the predetermined retardation angle KASNP is determined. On the contrary, when a part of the latter period of the sequence of the operations of the throttle valve 11 (the period after the throttle valve 11 starts closing) does not overlap with the intake stroke, the sequence of the operations of the throttle valve 11 does not lead to a substantial change in the air intake of the internal combustion engine 1, and thus the predetermined retardation angle KASNP is not determined. In this manner, the occurrence of knocking or the like caused by a substantial change in the air intake of the internal combustion engine 1 may be appropriately prevented.

In addition, the ignition control system for the internal combustion engine according to the present embodiment determines the predetermined retardation angle KASNP in accordance with the throttle opening change ΔTA during the latter period of the sequence of the operations of the throttle valve 11 (the period after the throttle valve 11 starts closing). The predetermined retardation angle KASNP, which is determined in accordance with the throttle opening change ΔTA during the latter period of the sequence of the operations of the throttle valve 11 (the period after the throttle valve 11 starts closing), addresses a substantial change in the air intake of the internal combustion engine 1, and thus the occurrence of knocking or the like may surely be prevented.

Next, a modified embodiment of a processing procedure for evaluating the ignition timing correction coefficient in ignition control performed by the CPU 31 of the ECU 30 employed in the ignition control system for the internal combustion engine according to one embodiment of the present invention is shown in a flowchart illustrated in FIG. 5, and will be described with reference to FIGS. 2 and 6. FIG. 6 is a graph employed in FIG. 5 for determining a predetermined retardation angle KASNP [° CA] (the ignition timing correction coefficient in the retardation direction) from the amount of the throttle opening change $\Delta$TA [°]. The routine for evaluating the ignition timing correction coefficient is repeatedly performed by the CPU 31 for each 5 ms.

Figure 5:
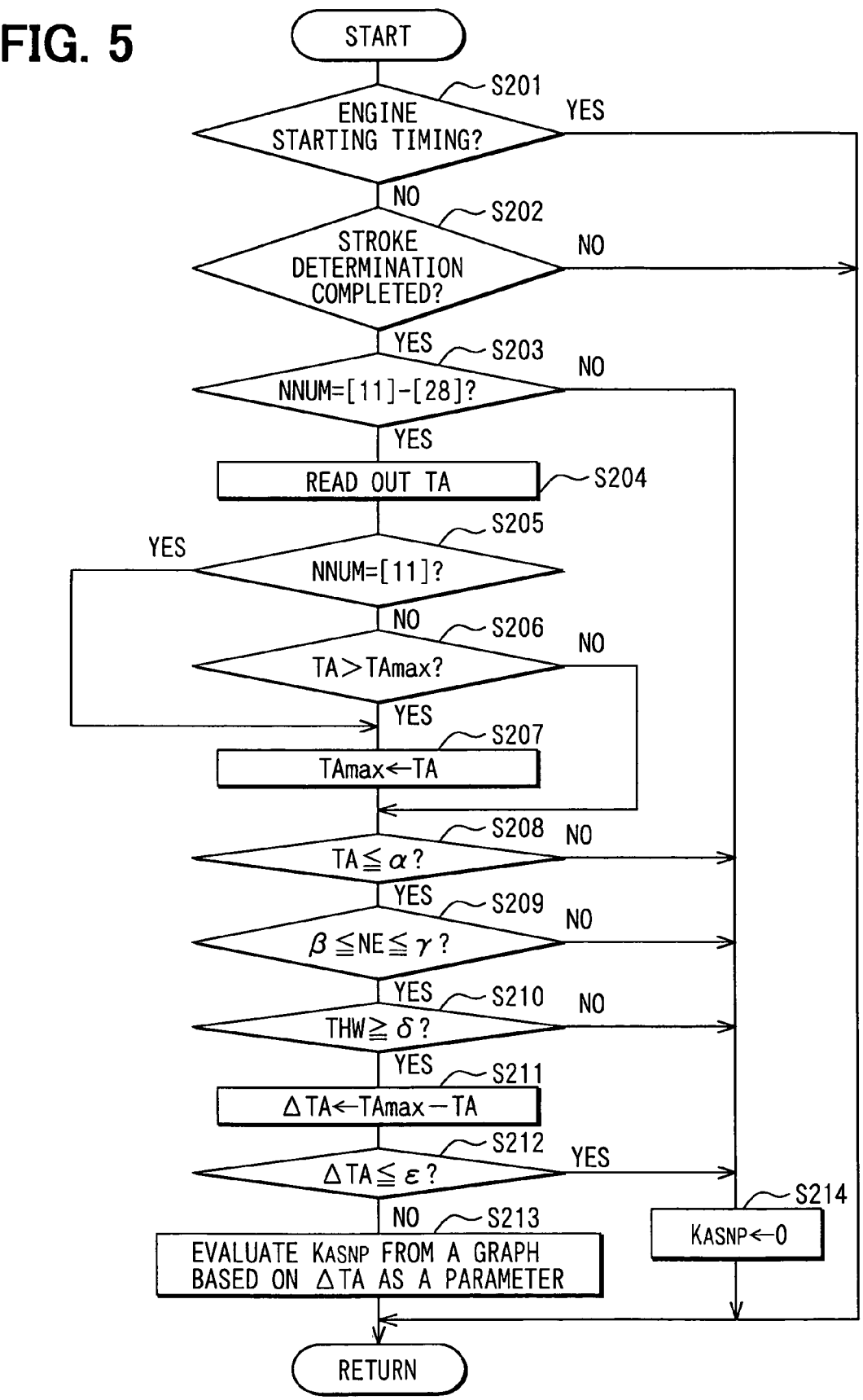
FIG. 5 is a flowchart showing a processing procedure for evaluating an ignition timing correction according to a modified embodiment of the present invention.

In FIG. 5, since steps S201 to S211 correspond to steps S101 to S111 in the embodiment described above, the details will not be given. Since the throttle opening change $\Delta$TA [°] in the range of a crank angle signal counter NNUM of 11 to 28 has been evaluated in step S211 through subtracting the throttle opening TA at a crank angle signal counter NNUM of 28 from the maximum throttle opening TAmax determined in the range of a crank angle signal counter NNUM of 11 to 28 (see FIG. 2), step S212 determines whether or not the throttle opening change $\Delta$TA [°] is equal to or less than a predetermined value $\epsilon$.

If the result of step 212 is no meaning that the throttle opening change $\Delta$TA [°] is larger than the predetermined value $\epsilon$, the routine proceeds to step S213. In step S213, the predetermined retardation angle KASNP [° CA] is evaluated by use of the graph shown in FIG. 6 and the throttle opening change $\Delta$TA, as a parameter, evaluated in step S211, and the routine is completed.

As in the embodiment describe above, if the result of step S203 is no meaning the crank angle signal counter NNUM does not fall within the range of 11 to 28, or if the result of step S208 is no meaning the throttle opening TA is larger than the predetermined throttle opening $\alpha$, or if the result of step S209 is no meaning the engine rotational speed NE does not fall within the range of the predetermined rotational speed $\beta$ [rpm] to the predetermined rotational speed $\gamma$ (around the idling rotational speed), or if the result of step S210 is no meaning the cooling water temperature THW is lower than the predetermined water temperature $\delta$ and the internal combustion engine 1 has not finished warming up, the routine proceeds to step S214. In step S214, the predetermined retardation angle KASNP is set to 0° CA, and the routine is completed.

If the result of step S212, which is a particular feature of the modified embodiment, is yes meaning that the throttle opening change $\Delta$TA [°] is equal to or less than the predetermined value $\epsilon$, the routine proceeds to step 214. In this case, since an air intake to the internal combustion engine 1 is substantially unchanged, the predetermined retardation angle KASNP is not determined. That is, the predetermined retardation angle KASNP is set to 0° CA without performing the computation processing in step S213, and the routine is completed.

As described above, the ignition timing correction means realized by the ECU 30 employed in the ignition control system for the internal combustion engine according to the modified embodiment is prohibited from determining the predetermined retardation angle KASNP when the throttle opening change $\Delta$TA during the latter period of the sequence of the operations of the throttle valve 11 (the period after the throttle valve 11 starts closing) is equal to or less than the predetermined value $\epsilon$.

The predetermined retardation angle KASNP is determined for correcting the ignition timing in accordance with the throttle opening change $\Delta$TA during the latter period of the sequence of the operations of the throttle valve 11 (the period after the throttle valve 11 starts closing). If the throttle opening change $\Delta$TA is equal to or less than the predetermined value $\epsilon$, an air intake to the internal combustion engine 1 is substantially unchanged. Therefore, the predetermined retardation angle KASNP is set to 0° CA without performing the computation processing, as shown in FIG. 6. In this manner, the computational processing speed may be improved when the throttle opening change $\Delta$TA falls within the range of 0[°] to the predetermined value $\epsilon$[°].

When the throttle opening change $\Delta$TA is larger than the predetermined value $\epsilon$[°] (outside the above range), as in the embodiment described above, the predetermined retardation angle KASNP, which is determined in accordance with the throttle opening change $\Delta$TA during the latter period of the sequence of the operations of the throttle valve 11 (the period after the throttle valve 11 starts closing), is set to the optimal value which addresses a substantial change in the air intake of the internal combustion engine 1. Therefore, the occurrence of knocking or the like may be prevented.

In the embodiment and the modified embodiment described above, the details have been given in the case where the internal combustion engine is a four-cycle single-cylinder engine, but the invention is not limited thereto. The present invention may be applied to a four-cycle multi-cylinder engine. The four-cycle multi-cylinder engine comprises a plurality of cylinders, and an air intake to each of the cylinders is controlled independently. In this case, through implementing retardation angle control with respect to the ignition timing for each cylinder as described above, the same effects as in the embodiment and the modified embodiment may be obtained.

What is claimed is:

1. An ignition control system for an internal combustion engine comprising:

throttle opening detection means for detecting a throttle opening of a throttle valve disposed in an intake passage of the internal combustion engine;

crank angle detection means for detecting a crank angle signal associated with the rotation of a crankshaft of the internal combustion engine;

stroke determination means for determining a stroke based on the crank angle signal detected by the crank angle detection means; and ignition timing correction means for correcting ignition timing in a retardation direction by a predetermined retardation angle when the throttle valve is rapidly opened to a predetermined throttle opening and then rapidly closed within a predetermined time period including one combustion cycle of the internal combustion engine, the combustion cycle being defined by the stroke determination means, and the predetermined retardation angle being based on at least the throttle opening.

2. The ignition control system for an internal combustion engine according to claim 1, wherein the ignition timing correction means determines the predetermined retardation angle when the sequence of the operations of the throttle valve is completed within 100 ms.

3. The ignition control system for an internal combustion engine according to claim 1, wherein the ignition timing correction means determines the predetermined retardation angle when the sequence of the operations of the throttle valve is performed at an engine rotational speed, which is evaluated based on the crank angle signal, of about an idling rotational speed.

4. The ignition control system for an internal combustion engine according to claim 1, wherein the ignition timing correction means determines the predetermined retardation angle when at least a part of a latter period of the sequence of the operations of the throttle valve overlaps with an intake stroke of one combustion cycle of the internal combustion engine, the latter period being a period after the throttle valve starts closing.

5. The ignition control system for an internal combustion engine according to claim 1, wherein the predetermined retardation angle is determined in accordance with a throttle opening change during a latter period of the sequence of the operations of the throttle valve, the latter period being a period after the throttle valve starts closing.

6. The ignition control system for an internal combustion engine according to claim 1, wherein the ignition timing correction means is prohibited from determining the predetermined retardation angle when a throttle opening change during a latter period of the sequence of the operations of the throttle valve is equal to or less than a predetermined value, the latter period being a period after the throttle valve starts closing.

7. The ignition control system for an internal combustion engine according to claim 1, wherein the internal combustion engine is a four-cycle single-cylinder engine or an independent intake type, four-cycle multi-cylinder engine.

8. An ignition control system for an internal combustion engine comprising:

a throttle opening detector for detecting a throttle opening of a throttle valve disposed in an intake passage of the internal combustion engine;

a crank angle detector for detecting a crank angle signal associated with the rotation of a crankshaft of the internal combustion engine;

a stroke determiner for determining a stroke based on the crank angle signal detected by the crank angle detector; and an ignition timing corrector for correcting ignition timing in a retardation direction by a predetermined retardation angle when the throttle valve is rapidly opened to a predetermined throttle opening and then rapidly closed within a predetermined time period including one combustion cycle of the internal combustion engine, the combustion cycle being defined by the stroke determiner, and the predetermined retardation angle being based on at least the throttle opening.

9. The ignition control system for an internal combustion engine according to claim 8, wherein the ignition timing corrector determines the predetermined retardation angle when the sequence of the operations of the throttle valve is completed within 100 ms.

10. The ignition control system for an internal combustion engine according to claim 8, wherein the ignition timing corrector determines the predetermined retardation angle when the sequence of the operations of the throttle valve is performed at an engine rotational speed, which is evaluated based on the crank angle signal, of about an idling rotational speed.

11. The ignition control system for an internal combustion engine according to claim 8, wherein the ignition timing corrector determines the predetermined retardation angle when at least a part of a latter period of the sequence of the operations of the throttle valve overlaps with an intake stroke of one combustion cycle of the internal combustion engine, the latter period being a period after the throttle valve starts closing.

12. The ignition control system for an internal combustion engine according to claim 8, wherein the predetermined retardation angle is determined in accordance with a throttle opening change during a latter period of the sequence of the operations of the throttle valve, the latter period being a period after the throttle valve starts closing.

13. The ignition control system for an internal combustion engine according to claim 8, wherein the ignition timing corrector is prohibited from determining the predetermined retardation angle when a throttle opening change during a latter period of the sequence of the operations of the throttle valve is equal to or less than a predetermined value, the latter period being a period after the throttle valve starts closing.

14. The ignition control system for an internal combustion engine according to claim 8, wherein the internal combustion engine is a four-cycle single-cylinder engine or an independent intake type, four-cycle multi-cylinder engine.

* * * * *